(12) United States Patent
Li et al.

(10) Patent No.: US 10,397,147 B2
(45) Date of Patent: Aug. 27, 2019

(54) METHOD, APPARATUS AND DEVICE FOR EXCHANGING NAME CARD

(71) Applicant: TENCENT TECHNOLOGY (SHENZHEN) COMPANY LIMITED, Shenzhen, Guangdong (CN)

(72) Inventors: Jingzhong Li, Shenzhen (CN); Junhong Yan, Shenzhen (CN); Jinsheng Xu, Shenzhen (CN); Wenyuan Wang, Shenzhen (CN); Wei Yi, Shenzhen (CN); Kaiyuan LV, Shenzhen (CN); Xiaomu Wen, Shenzhen (CN); Jing He, Shenzhen (CN); Bin Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/100,232

(22) PCT Filed: Nov. 28, 2014

(86) PCT No.: PCT/CN2014/092443
§ 371 (c)(1),
(2) Date: May 27, 2016

(87) PCT Pub. No.: WO2015/078402
PCT Pub. Date: Jun. 4, 2015

(65) Prior Publication Data
US 2017/0026316 A1 Jan. 26, 2017

(30) Foreign Application Priority Data
Nov. 29, 2013 (CN) .......................... 2013 1 0629240

(51) Int. Cl.
*H04L 12/58* (2006.01)
*H04W 4/12* (2009.01)
(Continued)

(52) U.S. Cl.
CPC .............. *H04L 51/04* (2013.01); *H04L 51/28* (2013.01); *H04L 67/306* (2013.01);
(Continued)

(58) Field of Classification Search
CPC ....... H04L 51/04; H04L 51/28; H04L 67/306; H04M 1/274516; H04W 4/12
See application file for complete search history.

(56) References Cited

U.S. PATENT DOCUMENTS 2,893,804 A * 7/1959 Palmer ...................... A47F 3/02
221/34
8,726,294 B2 * 5/2014 Benedek ................. G06F 9/544
713/2

(Continued)

FOREIGN PATENT DOCUMENTS

CN 102026110 A 4/2011
CN 102857403 A 1/2013
(Continued)

OTHER PUBLICATIONS

Extended European Search Report for International Application No. 14865615.0 dated Nov. 11, 2016 in 8 pages.
(Continued)

*Primary Examiner* — Michael Won
(74) *Attorney, Agent, or Firm* — Knobbe Martens Olson & Bear LLP

(57) ABSTRACT

The present disclosure provides a method, apparatus and terminal for exchanging a name card, which relates to mobile communication technologies. The method comprises: binding the contact client with a first Instant Messaging (IM) client through an associated account, the contact client comprising a contact; receiving a selecting signal for selecting at least one name card in the contact; sending the selected at least one name one name card to the first IM
(Continued)

client binded with the contact client, the first IM client comprising a first user account, and the first user account having a friendship link; and sharing the selected at least one name card through the first user account with at least one second IM client in the friendship link.

10 Claims, 11 Drawing Sheets

(51) Int. Cl.
    *H04L 29/08* (2006.01)
    *H04M 1/2745* (2006.01)
    *H04W 88/02* (2009.01)
(52) U.S. Cl.
    CPC ....... *H04M 1/274516* (2013.01); *H04W 4/12* (2013.01); *H04W 88/02* (2013.01)

(56) References Cited

U.S. PATENT DOCUMENTS

| | | | | |
|---|---|---|---|---|
| 9,294,867 B2* | 3/2016 | I'Anson | | H04M 7/0012 |
| 9,408,077 B1* | 8/2016 | David | | H04W 4/14 |
| 2003/0158855 A1* | 8/2003 | Farnham | | G06F 3/0481 |
| 2004/0122683 A1* | 6/2004 | Grossman | | G06Q 10/10 |
| | | | | 715/864 |
| 2004/0267887 A1* | 12/2004 | Berger | | G06Q 10/109 |
| | | | | 709/206 |
| 2005/0198299 A1* | 9/2005 | Beck | | G06Q 10/107 |
| | | | | 709/226 |
| 2006/0165060 A1* | 7/2006 | Dua | | G06Q 20/20 |
| | | | | 370/352 |
| 2008/0021958 A1* | 1/2008 | Foote | | H04L 12/1822 |
| | | | | 709/204 |
| 2008/0059587 A1* | 3/2008 | Burtner | | H04L 51/36 |
| | | | | 709/206 |
| 2008/0133677 A1 | 6/2008 | Pattabhiraman et al. | | |
| 2011/0003585 A1* | 1/2011 | Wang | | H04M 1/72583 |
| | | | | 455/418 |
| 2011/0113084 A1* | 5/2011 | Ramnani | | G06Q 30/02 |
| | | | | 709/201 |
| 2011/0161319 A1* | 6/2011 | Chunilal | | G06F 17/30867 |
| | | | | 707/733 |
| 2013/0304563 A1* | 11/2013 | Haupt | | G06Q 30/02 |
| | | | | 705/14.35 |
| 2014/0066044 A1* | 3/2014 | Ramnani | | H04W 8/24 |
| | | | | 455/418 |
| 2014/0207888 A1 | 7/2014 | Zheng | | |
| 2014/0237335 A1 | 8/2014 | Liang et al. | | |
| 2014/0245396 A1* | 8/2014 | Oberheide | | H04L 63/08 |
| | | | | 726/4 |
| 2014/0280243 A1* | 9/2014 | Lee | | G06Q 10/10 |
| | | | | 707/751 |

FOREIGN PATENT DOCUMENTS

| | | |
|---|---|---|
| CN | 102882771 A | 1/2013 |
| CN | 102882953 A | 1/2013 |
| CN | 103036762 A | 4/2013 |
| CN | 103326923 A | 9/2013 |
| CN | 103379135 A | 10/2013 |
| WO | WO 2010/008542 A2 | 1/2010 |
| WO | WO 2011/032408 A1 | 3/2011 |

OTHER PUBLICATIONS

International Search Report for International Application No. PCT/CN2014/092443, dated Feb. 27, 2015, 2 pages.

Written Opinion of the International Searching Authority for International Application No. PCT/CN2014/092443, dated Feb. 27, 2015, 3 pages.

Office Action Issued in Chinese Application No. 201310629240.3 dated Jan. 10, 2018, 10 pages.

* cited by examiner

METHOD, APPARATUS AND DEVICE FOR EXCHANGING NAME CARD

CROSS-REFERENCE TO RELATED APPLICATIONS

This application claims the benefit of Chinese Patent Application No. 201310629240.3, filed on Nov. 29, 2013, the disclosure of which is incorporated herein in its entirety by reference.

FIELD

The present disclosure relates to mobile communication technologies, more particularly to a method, apparatus and terminal for exchanging a name card.

BACKGROUND

With the development of mobile communication technologies, a mobile phone has already become one of mostly used communication tools in daily life. In order to enable a user to communicate with friends conveniently, a contact has already become one of essential functions in the mobile phone.

In practical application, when a user wants to share a name card in a contact client with an Instant Messaging (IM) client, the user may copy the name card which needs to be sent in the contact of the contact client, paste the copied name card in a input box of IM message, and finally the IM client sends the name card in the contact in a way of sending an IM message. When the user wants to store a name card received by the IM client in the contact of the contact client, the user needs to first write down all the contents of the received name card by a paper and a pen, including the phone number, name and email box, etc, and then establish a new name card after the operation terminal enters a local contact, manually input the contents that have been written down to the corresponding input box, and finally the terminal stores the name card in the contact according to the received contents.

SUMMARY

Embodiments of the present disclosure provide a method, apparatus and terminal for exchanging a name card.

In an aspect, the present disclosure provides a method for arranging communication records applied to a contact client, comprising:

binding the contact client with a first Instant Messaging (IM) client through an associated account, the contact client comprising a contact;

receiving a selecting signal for selecting at least one name card in the contact;

sending the selected at least one name card to the first IM client binded with the contact client, the first IM client comprising a first user account, and the first user account having a friendship link; and sharing the selected at least one name card through the first user account with at least one second IM client in the friendship link.

In another aspect, the present disclosure provides a method for exchanging a name card applied to a first Instant Messaging (IM) client, comprising:

binding the first IM client with a contact client through an associated account;

receiving at least one name card sent by the contact client binded with the first IM client, the first IM client comprising a first user account, and the first user account having a friendship link; and sharing the received at least one name card through the first user account with at least one second IM client in the friendship link.

In a yet aspect, the present disclosure provides an apparatus for exchanging a name card applied to a contact client, comprising: one or more processors; and a memory having instructions stored thereon, the instructions, when executed by the one or more processors, cause the processors to perform operations comprising:

binding the contact client with a first Instant Messaging (IM) client through an associated account, the contact client comprising a contact;

receiving a selecting signal for selecting at least one name card in the contact;

sending the selected at least one name card to the first IM client binded with the contact client, the first IM client comprising a first user account, and the first user account having a friendship link; and sharing the selected at least one name card through the first user account with at least one second IM client in the friendship link.

In yet another aspect, the present disclosure provides an apparatus for exchanging a name card applied to a first Instant Messaging (IM) client, comprising: one or more processors; and a memory having instructions stored thereon, the instructions, when executed by the one or more processors, cause the processors to perform operations comprising:

binding the first IM client with a contact client through an associated account;

receiving at least one name card sent by the contact client binded with the first IM client, the first IM client comprising a first user account, and the first user account having a friendship link; and sharing the received at least one name card through the first user account with at least one second IM client in the friendship link.

BRIEF DESCRIPTION OF THE DRAWINGS

In order to make technical solutions of embodiments of the present disclosure clearer, accompanying drawings to be used in description of the embodiments will be simply introduced hereinafter. Obviously, the accompanying drawings to be described hereinafter are only some embodiments of the present disclosure. Those skilled in the art may obtain other drawings according to these accompanying drawings without creative labor.

DETAILED DESCRIPTION

In the existing method, when the contact client and the IM client exchanges a name card, it cannot be performed by directly sending the name card by the IM client, or, by storing the name card received by the IM client to the contact. Hence, the existing method for exchanging a name card has a low efficiency.

In order to make the object, technical solution and merits of the present disclosure clearer, the present disclosure will be illustrated in detail hereinafter with reference to the accompanying drawings and specific embodiments. Obviously, the embodiments to be described hereinafter are only a part of embodiments in the present disclosure, but not all the embodiments. According to these embodiments, those skilled in the art may obtain other embodiments without creative labor, which all belong to the scope protected by the present disclosure.

Figure 1:
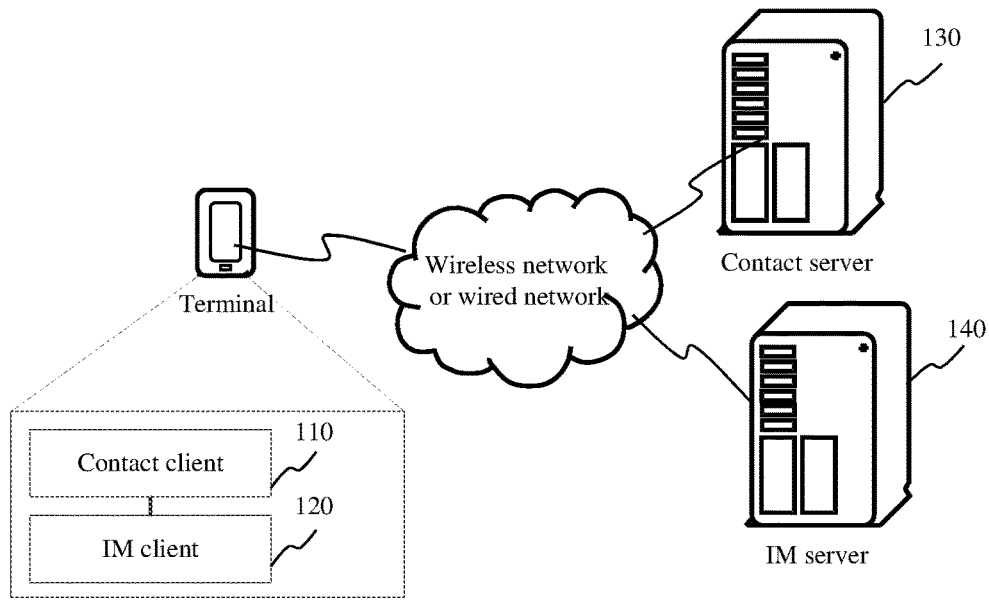
FIG. 1 is a schematic diagram illustrating a structure of network related to the present disclosure.

FIG. 1 is a schematic diagram illustrating a structure of a network related to the present disclosure. The network includes a contact client 110, an IM client 120, a contact server 130 and an IM server 140 corresponding to the IM client.

The contact client 110 is a first type of client operated in the terminal. The first type of client may be a client provided by a service provider A, where the contact client may store a contact in the terminal.

In an embodiment, the contact client may be a non-instant messaging client. For example, the contact client may not be able to exchange the name card instantly.

The IM client 120 is a second type of client operated in the terminal. The second type of client may be a client provided by a service provider B. The service provider B has several users and friendship links among those users. It should be noted that, the contact client 110 and the IM client 120 may be operated in a same terminal, and the contact client 110 may communicate with the IM client 120 by a Software Development Kit (SDK) provided by the IM client 120, and the contact client 110 may be binded with the IM client 120 through an associated account.

The contact server 130 is a server provided by the service provider A, configured to synchronize the contact in the contact client 110. The contact corresponding to the associated account and synchronized in the contact server 130 may be shared by the contact client 110 and the IM client 120. The contact server 130 may communicate with the IM client 120 and/or the contact client 110 through a wireless network or a wired network.

The IM server 140 is configured to, in combination with the IM client 120, provide the user a service which is provided by the service provider B. The IM server 140 may communicate with the IM client 120 and/or the contact client 110 through a wireless network or a wired network. The IM server is a background server of the IM client.

The above-described terminal may be mobile phone. And several terms used in the embodiments of the present disclosure are defined as follows:

a public account: refers to a communication account provided in IM applications for any one of media, departments, enterprises, and public persons; only if a common account concerns the public account, the common account can read and use the information and service provided by the public account;

a social information sharing platform: refers to a quasi-social webpage provided in IM applications; the quasi-social webpage can share information of a user with several friend users at the same time, and the user may also use this platform to search for the information shared by the several friend users, for example, "friend circle" in the WeChat client, "QQ space" in the QQ client, and "friend networking" in the QQ client.

It should be noted that, the above-described architecture is just an example to illustrate the embodiments of the present disclosure. In practical implementation, it may add or delete some devices according to different usage scenarios.

Embodiment 1

Figure 2A:
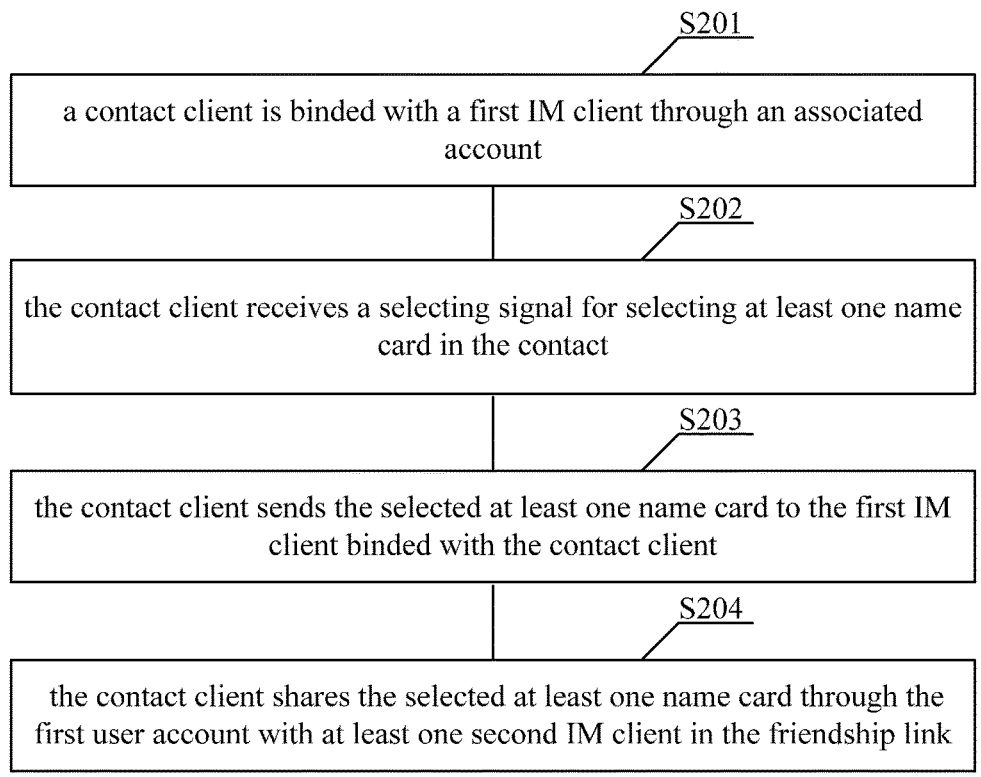
FIG. 2A is a flow diagram illustrating a method for exchanging a name card applied to a contact client according to a first embodiment of the present disclosure.

FIG. 2A is a flow diagram illustrating a method for exchanging a name card applied to the contact client according to a first embodiment of the present disclosure. In the embodiment, the method for exchanging a name card is applied in the architecture as shown in FIG. 1 for illustration. The method includes the following procedures.

In S201, a contact client is binded with a first IM client through an associated account.

The contact client may be binded with at least one IM client through an associated account.

To differentiate the IM client binded with the contact client from another IM client which is not binded with the contact client, the IM client binded with the contact client may be referred to as a first IM client, and another IM client which is not binded with the contact client may be referred to as a second IM client.

The first IM client binded with the contact client includes a first user account, and the first user account has a friendship link.

In an embodiment, the friendship link may be configured to indicate the relationship among friends of the first user account. For example, in the above-described social information sharing platform, the first user account may share information with friends through the friendship link. The shared information may include a name card. The social information sharing platform uses the friendship link to share the information among friends.

Further, the friendship link may also include the information of each linked friend. For example, the friendship link may include a table of friend items of all the friends of the first user account.

In S202, the contact client receives a selecting signal for selecting at least one name card in the contact.

In S203, the contact client sends the selected at least one name card to the first IM client binded with the contact client.

In S204, the contact client shares the selected at least one name card through the first user account with at least one second IM client in the friendship link.

In an embodiment, the second IM client includes a second user account. In the above-described method, the contact client may further obtain the second user account of the second IM client in the friendship link through the first user account; receive a name card of the second user account; and add the received name card to the contact of the contact client.

Figure 2B:
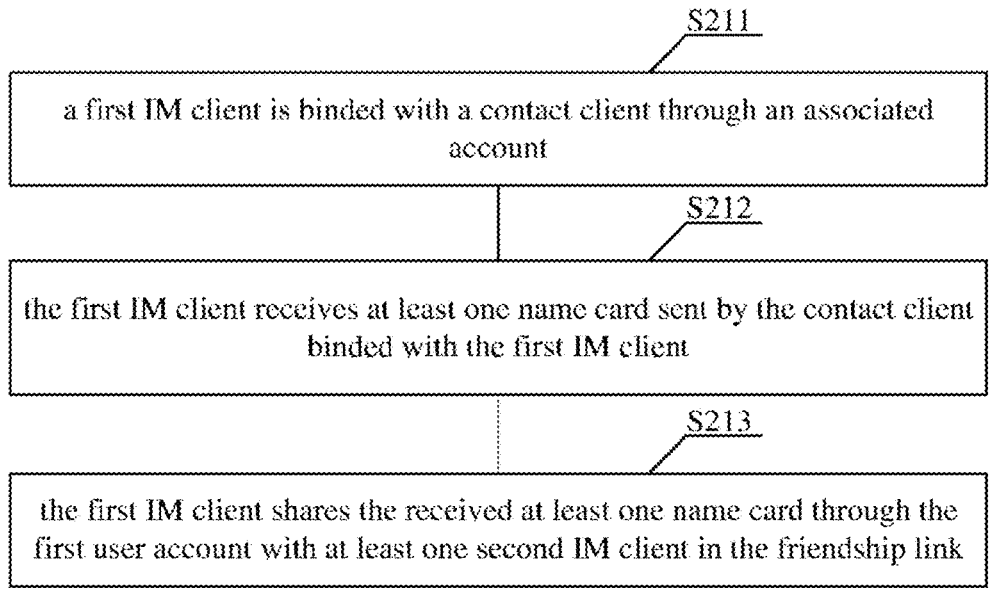
FIG. 2B is a flow diagram illustrating a method for exchanging a name card applied to an IM client according to a first embodiment of the present disclosure.

FIG. 2B is a flow diagram illustrating a method f or exchanging a name card applied to the first IM client according to the first embodiment of the present disclosure. The method includes the following procedures.

In S211, a first IM client is binded with a contact client through an associated account.

In S212, the first IM client receives at least one name card sent by the contact client binded with the first IM client.

In S213, the first IM client shares the received at least one name card through the first user account with at least one second IM client in the friendship link.

In an embodiment, the first IM client may further obtain a second user account of the second IM client in the friendship link through the first user account; and send a name card of the second user account to the contact client binded with the first IM client.

Based on the above, according to the method for exchanging a name card provided by the embodiment of the present disclosure, a contact client is binded with an IM client through an associated account; the contact client shares a name card in the contact of the contact client through a friendship link in the binded IM client; and/or, obtains a name card through the friendship link in the binded IM client, and adds the name card into the contact of the contact client, so that a problem in the prior art of low exchanging efficiency when exchanging a name card between the contact client and the IM client is solved; the name card in the contact client can be shared with the IM client, and the name card can be delivered using the friendship link in the IM client. Hence, the name card exchanging becomes convenient and rapid, and the exchanging efficiency is improved.

Because the contact client may share a name card in the contact client with others through the friendship link in the binded IM client; or may also obtain a name card through the friendship link in the binded IM client and add the name card into the contact of the contact client, these two cases will be described in detail according to different embodiments in the following.

Embodiment 2

Figure 3A:
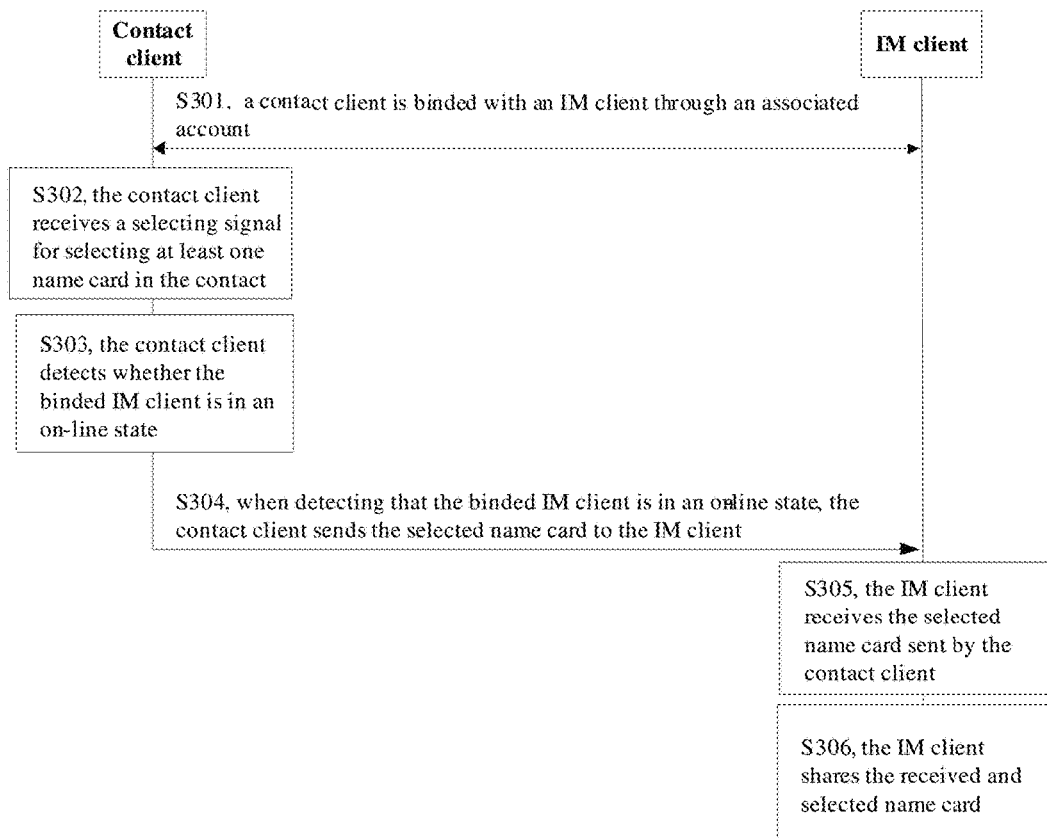
FIG. 3A is a flow diagram illustrating a method for exchanging a name card according to a second embodiment of the present disclosure.

FIG. 3A is a flow diagram illustrating a method for exchanging a name card according to a second embodiment of the present disclosure. In the embodiment, the method for exchanging a name card is applied in the architecture as shown in FIG. 1 for illustration, and the contact client shares a name card in the contact of the contact client through the friendship link in the binded IM client. The method includes the following procedures.

In S301, a contact client is binded with an IM client through an associated account.

The contact client may be binded with the IM client through an associated account. In particular, after the terminal installs a contact client, the contact stored in the contact client corresponds to a phone number of the terminal, that is, the identifier of the contact client is the phone number. In addition, because the IM client may also be binded with the phone number, the user may access the IM client through an IM account, or access the IM client through the binded phone number. Hence, in order to facilitate the user, the associated account may be the phone number in the embodiment. In practical implementation, it may also register a new user account, and use the registered user account as the associated account to bind, which is not defined in detail herein.

After the contact client is binded with the IM client, information in the two clients can be shared, that is, the contact client may access the information in the IM client, and the IM client may access the information in the contact client.

In an embodiment, when the information to be shared between the contact client and the IM client is a name card, the format of the name card may be specified when binding the contact client and the IM client. Thus, the contact client and the IM client may read, generate, or modify the contents of the shared name card using the specified format if needed.

In S302, the contact client receives a selecting signal for selecting at least one name card in the contact.

When the user wants to share with friends the name card in the contact, the use may apply a selecting signal for selecting in the contact at least one name card to be shared. Accordingly, the contact client may receive a selecting signal for selecting at least one name card in the contact.

For example, when a friend "Xiaoming" asks the user for the phone number of "Xiaohua", the user may search in the contact for the name card of "Xiaohua", and select the searched name card. Accordingly, the contact client may receive a selecting signal for selecting the name card of "Xiaohua". Similarly, when the user needs to share two or more than two name cards at the same time, the terminal may receive a selecting signal for selecting two or more than two name cards, which is not described in detail herein.

It should be noted that, the name card stored in the contact may only include text information, or may also include both the text information and the corresponding two-dimension code. The specific manner of name card is not defined in detail herein.

In S303, the contact client detects whether the binded IM client is in an on-line state.

After the contact client receives the selecting signal, the contact client may detect whether the binded IM client is in an on-line state, and select the sharing manner according to whether the IM client is in an on-line state. The sharing manner includes sharing by the IM client, and sharing by a short message (SMS).

It should be noted that, because information of the contact client and information of the IM client can be shared, when the contact client receives the selecting signal, the contact client may inquire whether the IM client is in an on-line state. The specific inquiring way is not defined in detail herein.

In S304, when detecting that the binded IM client is in an on-line state, the contact client sends the selected name card to the IM client.

When detecting that the binded IM client is in an on-line state, the contact client may send the selected name card to the IM client through the binded IM client, so that the IM client may send the received name card to a designated friend in the IM client corresponding to the associated account, or send to the social information sharing platform in the IM client.

When detecting that the binded IM client is in an off-line state, it indicates that the IM client cannot be used, so the contact client may directly send the name card to a designated friend through a SMS.

In S305, the IM client receives the selected name card sent by the contact client.

The selected name card is sent to the IM client after the contact client receives a selecting signal for selecting at least one name card in the contact, and detects that the binded IM client is in an on-line state.

In S306, the IM client shares the received and selected name card.

After the IM client receives the selected name card sent by the contact client, the IM client may share the received and selected name card.

In particular, the way of the IM client sharing the received and selected name card may include the following two ways:

(1) the IM client sends the selected name card to a designated friend of the associated account in the IM client.

In particular, after the IM client receives the selected name card sent by the contact client, the IM client provides a friend selecting interface corresponding to the associated account. When the IM client receives the selecting signal of the user selecting friends, and receives a confirm signal of confirming sharing, the IM client sends the selected name card to the selected friends.

(2) the IM client sends the selected name card to a social information sharing platform of the associated account in the IM client.

For example, the IM client provides a social information sharing platform named as "friend circle". Then, after the contact client sends the selected name card to the IM client, the IM client may directly share the selected name card in the "friend circle". In practical implementation, the IM client may also provide an interface of "to be confirmed" that the selected name card will be delivered in the "friend circle", so that after receiving a delivering instruction, the selected name card is delivered in the "friend circle".

It should be noted that the above-described ways of sharing the name card with a designated friend or sharing the name card in the social information sharing platform are only examples. In practical implementation, the contact client may share the name card using the above-described two ways at the same time, which is not defined in detail herein.

Figure 3B:
FIG. 3B is a schematic diagram illustrating a display interface for selecting a sharing manner provided by a contact client according to a second embodiment of the present disclosure.
Figure 3C:
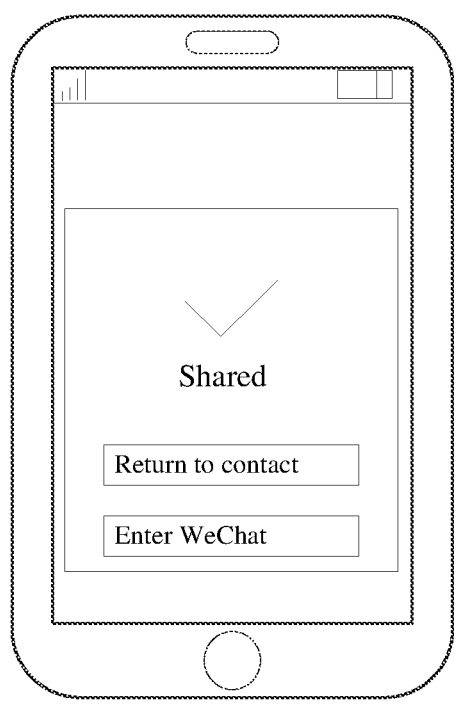
FIG. 3C is a schematic diagram illustrating a display interface after the IM client shares a name card according to a second embodiment of the present disclosure.

It should also be noted that, after the contact client receives a selecting signal in S302, the contact client may directly switch to the interface as shown in FIG. 3B so as to receive a trigger signal for selecting at least one sharing way as shown in FIG. 3B, and after receiving the trigger signal, share the selected name card by the selected sharing way. The specific sharing way is not defined in detail herein. In addition, after the contact client shares the selected name card by the IM client, the IM client may switch to the interface as shown in FIG. 3C so as to return to the contact client or enter the IM client according to the selecting signal received in the interface as shown in FIG. 3C, which is not defined in detail herein.

Based on the above, according to the method for exchanging a name card provided by the embodiment of the present disclosure, a contact client is binded with an IM client through an associated account; the contact client shares a name card in the contact of the contact client through the friendship link in the binded IM client, so that a problem in the prior art of low exchanging efficiency when exchanging a name card between the contact client and the IM client is solved; the name card in the contact client can be shared with the IM client, and the name card can be delivered using the friendship link in the IM client. Hence, the name card exchanging becomes convenient and rapid, and the exchanging efficiency is improved.

When the contact client needs to share the name card with friends, the contact client may first detect whether the IM client is in an on-line state, so that when detecting that the IM client is in an on-line state, the contact client directly sends the name card to friends by the IM client. Hence, the information exchanging efficiency when the contact client shares the name card to the IM client is improved.

Embodiment 3

Figure 4:
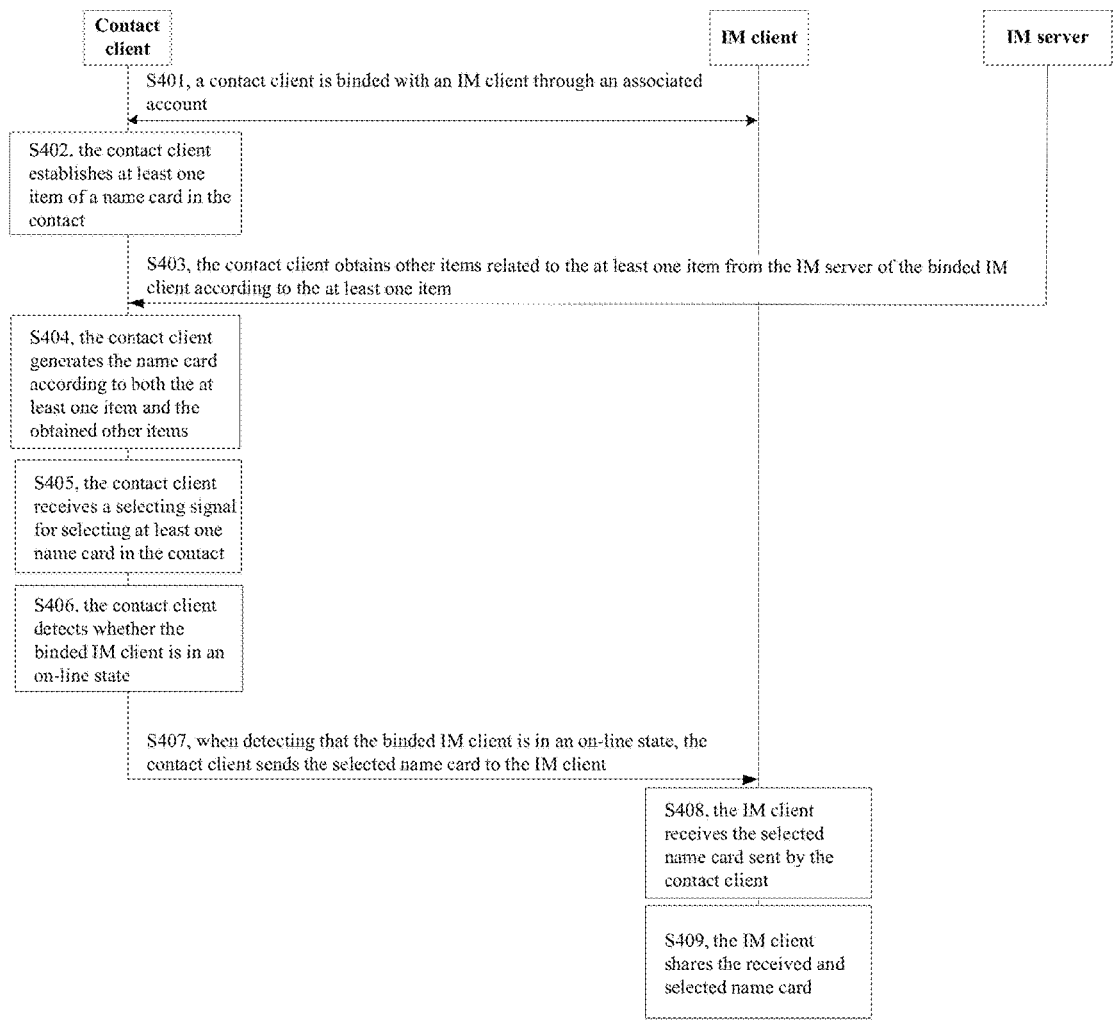
FIG. 4 is a flow diagram illustrating a method for exchanging a name card according to a third embodiment of the present disclosure.

FIG. 4 is a flow diagram illustrating a method for exchanging a name card according to a third embodiment of the present disclosure. In the embodiment, the method for exchanging a name card is applied in the architecture as shown in FIG. 1 for illustration. The difference from the second embodiment is that, before sharing a name card, the contact client first generates the name card in the contact according to both the at least one item established in the contact and other items obtained by the binded IM client. The method includes the following procedures.

In S401, a contact client is binded with an IM client through an associated account.

The contact client may be binded with the IM client through an associated account. In particular, after the terminal installs a contact client, the contact stored in the contact client corresponds to a phone number of the terminal, that is, the identifier of the contact client is the phone number. In addition, because the IM client may also be binded with the phone number, the user may access the IM client through an IM account, or access the IM client through the binded phone number. Hence, in order to facilitate the user, the associated account may be the phone number in the embodiment. In practical implementation, it may also register a new user account, and use the registered user account as the associated account to bind, which is not defined in detail herein.

After the contact client is binded with the IM client, information in the two clients can be shared, that is, the contact client may access the information in the IM client, and the IM client may access the information in the contact client.

In S402, the contact client establishes at least one item of a name card in the contact.

The user may establish a new name card in the contact of the contact client. In practical implementation, the user may establish at least one item of a name card in the contact. Correspondingly, the contact client may establish at least one item of a name card in the contact.

For example, when establishing a new name card, the user may input a phone number and a name of a friend in an input box of establishing a name card, and then the contact client may establish the phone number and the name of the name card in the contact.

In S403, the contact client obtains other items related to the at least one item from the IM server of the binded IM client according to the at least one item.

Because after the contact client is binded with the IM client, the contact client may access all the information of the IM client, in order to complete the newly established name card, after the contact client establishes at least one item of a name card in the contact, the contact client may obtain other items related to the at least one item from the IM server of the binded IM client according to the at least one item.

In particular, the contact client obtaining other items related to the at least one item from the IM server of the binded IM client according to the at least one item includes:

(1) the contact client sends the at least one item and the associated account to the IM server through a predetermined interface.

After receiving the at least one item and the associated account, the IM server of the IM client first detects whether the associated account has the authority to access data; when detecting the associated account has the authority to access data, determines the item corresponding to the associated account, and/or, searches in the items of the friendship links corresponding to the associated account for other items corresponding to the at least one item; after searching other items corresponding to the at least one item, the IM server may return the searched other items.

For example, if the associated account is "138120XXXXX", and a phone number established by the contact client in the contact is "158616XXXXX", the name is "Liming", then after the contact client sends the "138120XXXXX", "158616XXXXX" and "Liming" to the IM server of the binded IM client, the IM server may first detect whether the "138120XXXXX" has the authority to access data; when detecting that it has the authority to access data, determine the items of the corresponding friendship link according to the associated account "138120XXXXX", then match "158616XXXXX", "Liming" or combination thereof with the determined items of the friendship link, so as to determine the corresponding other items. For example, all the items corresponding to "158616XXXXX" determined by the IM server includes an avatar, name, phone number, email box, job, address, etc., so that the IM server may obtain the avatar, email box, job, address corresponding to "158616XXXXX" by matching, and feed back the matched items to the contact client.

(2) the contact client receives other items feed back by the IM server.

The contact client may receive other items feed back by the IM server. For example, the contact client may receive the avatar, email box, job and address corresponding to "158616XXXXX" feed back by the IM server.

Other items refers to the items related to at least one item, which is searched in the items corresponding to the associated account and/or in the friend items of the friendship link corresponding to the associated account after the IM server detects that the associated account has the authority to access data.

In S404, the contact client generates the name card according to both the at least one item and the obtained other items.

After receiving other items feed back by the IM server, the contact client may generate the name card in the contact according to both the at least one item and the obtained other items, such that, after receiving partial information of the name card established by the user, the contact client may automatically obtain the relevant other items. Hence, when assuring the completion of the information of the name card, the operation complexity when the user establishing the name card is reduced, and it becomes convenient for the user.

It should be noted that, the name card generated by the contact client may include information in a text format, or a two-dimension code corresponding to the text information generated by a two-dimension code generator, or combination thereof. The specific manner of name card is not defined in detail herein.

In S405, the contact client receives a selecting signal for selecting at least one name card in the contact.

When the user wants to share the name card in the contact with friends, the use may apply a selecting signal for selecting at least one name card to be shared in the contact. Accordingly, the contact client may receive a selecting signal for selecting at least one name card in the contact.

In S406, the contact client detects whether the binded IM client is in an on-line state.

After the contact client receives the selecting signal, the contact client may detect whether the binded IM client is in an on-line state, and select the sharing manner according to whether the IM client is in an on-line state. The sharing manner includes sharing by the IM client, and sharing by a SMS.

It should be noted that because information of the contact client and information of the IM client can be shared, when the contact client receives the selecting signal, the contact client may inquire whether the IM client is in an on-line state. The specific inquiring way is not defined in detail herein.

In S407, when detecting that the binded IM client is in an on-line state, the contact client sends the selected name card to the IM client.

When detecting that the binded IM client is in an on-line state, the contact client may send the selected name card to the IM client through the binded IM client.

When detecting the binded IM client is in an off-line state, it indicates that the IM client cannot be used, so the contact client may directly send the selected name card to a designated friend through a SMS.

In S408, the IM client receives the selected name card sent by the contact client.

In S409, the IM client shares the received and selected name card.

After the IM client receives the selected name card sent by the contact client, the IM client may share the received and selected name card.

In particular, the way of the IM client sharing the received and selected name card may include the following two ways:

(1) the IM client sends the selected name card to a designated friend of the associated account in the IM client.

In particular, after the IM client receives the selected name card sent by the contact client, the IM client provides a friend selecting interface corresponding to the associated account. When the IM client receives the selecting signal of the user selecting friends, and receives a confirm signal of confirming sharing, the IM client sends the selected name card to the selected friends.

(2) the IM client sends the selected name card to a social information sharing platform of the associated account in the IM client.

It should be noted that, this step is similar to the S306 in the second embodiment. The technical details may refer to description of the S306, which is not described in detail herein.

Based on the above, according to the method for exchanging a name card provided by the embodiment of the present disclosure, a contact client is binded with an IM client through an associated account; the contact client shares a name card in the contact through the friendship link in the binded IM client, so that a problem in the prior art of low exchanging efficiency when exchanging a name card between the contact client and the IM client is solved; the name card in the contact client can be shared with the IM client, and the name card can be delivered using the friendship link in the IM client. Hence, the name card exchanging becomes convenient and rapid, and the exchanging efficiency is improved.

In the embodiment, when establishing a name card in the contact client, the user may only input part of items of the name card; other items can be automatically obtained by the contact client from the IM server corresponding to the binded IM client. Hence, when assuring the completion of the information of the name card, the operation complexity when the user establishing the name card is reduced, and it becomes convenient for the user.

Embodiment 4

Figure 5A:
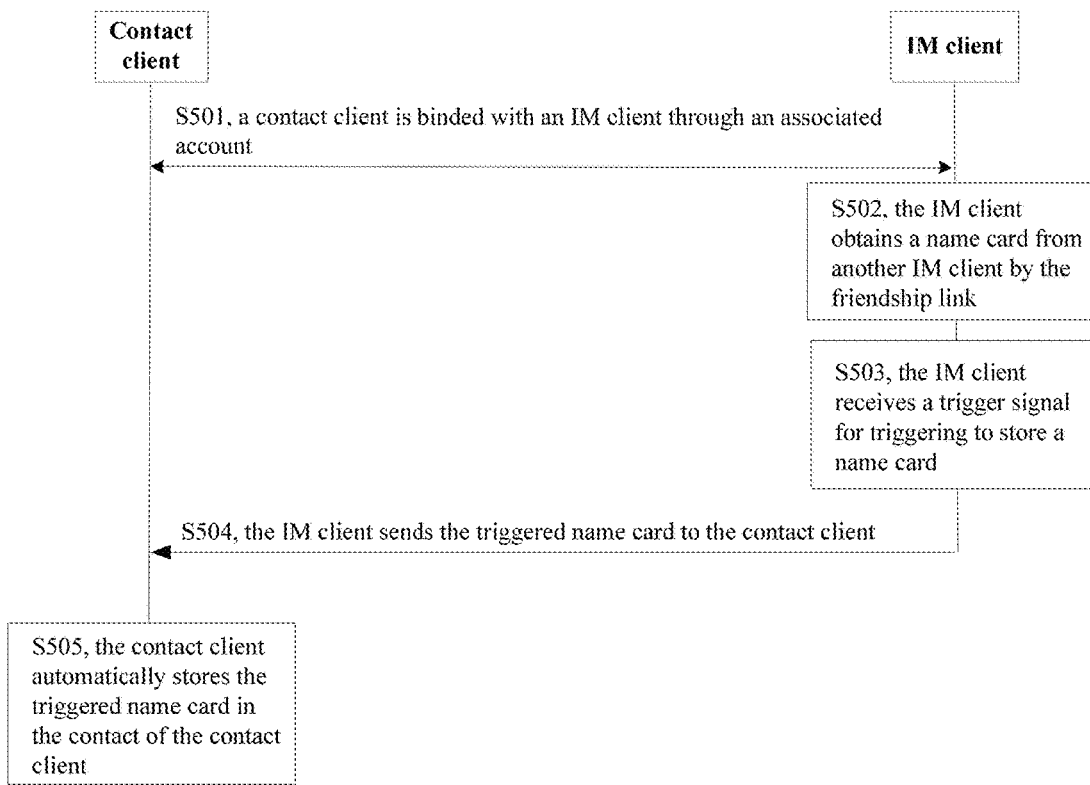
FIG. 5A is a flow diagram illustrating a method for exchanging a name card according to a fourth embodiment of the present disclosure.

FIG. 5A is a flow diagram illustrating a method for exchanging a name card according to a fourth embodiment of the present disclosure. In the embodiment, the method for exchanging a name card is applied in the architecture as shown in FIG. 1 for illustration, and the contact client obtains a name card by the friendship link in the binded IM client, and adds the name card into the contact of the contact client. The method includes the following procedures.

In S501, a contact client is binded with an IM client through an associated account.

The contact client may be binded with the IM client through an associated account. In particular, after the terminal installs a contact client, the contact stored in the contact client corresponds to a phone number of the terminal, that is, the identifier of the contact client is the phone number. In addition, because the IM client may also be binded with the phone number, the user may access the IM client through an IM account, or access the IM client through the binded phone number. Hence, in order to facilitate the user, the associated account may be the phone number in the embodiment. In practical implementation, it may also register a new user account, and use the registered user account as the associated account to bind, which is not defined in detail herein.

After the contact client is binded with the IM client, information in the two clients can be shared, that is, the contact client may access the information in the IM client, and the IM client may access the information in the contact client.

In S502, the IM client obtains a name card from another IM client by the friendship link.

In practical application, the user may use the IM client to communicate with other friends. Hence, the contact client may obtain a name card from another IM client by the friendship link.

The contact client obtaining a name card from another IM client by the friendship link includes the following ways:

(1) the contact client receives a name card directly sent by another IM client.

Because the user may communicate with another IM client by the IM client, and during the communication, it is possible for the user to receive a name card sent by friends in terms of an IM message. Hence, the IM client may receive the name card directly sent by another IM client.

Figure 5B:
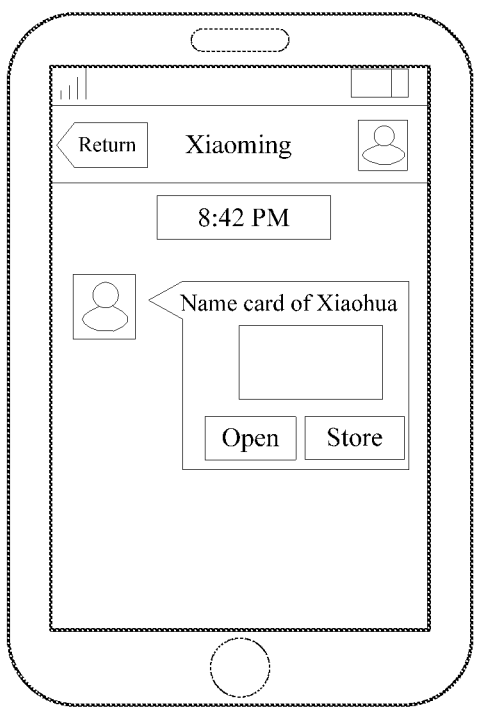
FIG. 5B is a schematic diagram illustrating a display interface when the IM client receives a name card sent from another IM client according to a fourth embodiment of the present disclosure.

For example, in FIG. 5B, during the chatting between the user and friend "Xiaoming" by an IM client, "Xiaoming" shares a name card of "Xiaohua" to the user. Then, the IM client may receive the name card directly sent by another IM client.

(2) the IM client receives a name card displayed by another IM client in the social information sharing platform.

Because the IM client may search in the social information sharing platform for information shared by all friends, when a friend shares a name card by another IM client, the contact client may receive a name card displayed by another IM client in the social information sharing platform.

It should be noted that, the name card generated by the contact client may include information in a text format, or a two-dimension code corresponding to the text information generated by a two-dimension code generator, or combination thereof. The specific manner of name card is not defined in detail herein.

In S503, the IM client receives a trigger signal for triggering to store a name card.

After the IM client obtains a name card from another IM client, in order to continue using the obtained name card, the user generally stores the obtained name card in the contact of the contact client. Hence, at this time, the user may apply a trigger signal in the IM client to trigger storing a name card. Accordingly, the IM client may receive the trigger signal for triggering to store a name card.

For example, in the display interface as shown in FIG. 5B, the user may click the "store" button in the IM client to trigger storing a name card. In practical application, the user may also directly click the name card to trigger storing, or press the name card for a long time to trigger storing. The specific manner of trigger signal is not defined in detail herein.

In S504, the IM client sends the triggered name card to the contact client.

After receiving a trigger signal for triggering to store a name card, the IM client may send the triggered name card to the contact client, so that the contact client may automatically store the triggered name card in the contact of the contact client.

In S505, the contact client automatically stores the triggered name card in the contact of the contact client.

Correspondingly, the contact client may receive the triggered name card sent by the IM client, and automatically store the triggered name card in the contact of the contact client. The triggered name card is sent to the contact client after the IM client receives the name card sent by another IM client and receives a trigger signal for triggering to store a name card. The name card sent by another IM client is the name card directly sent to the IM client or the name card displayed in the social information sharing platform.

Figure 5C:
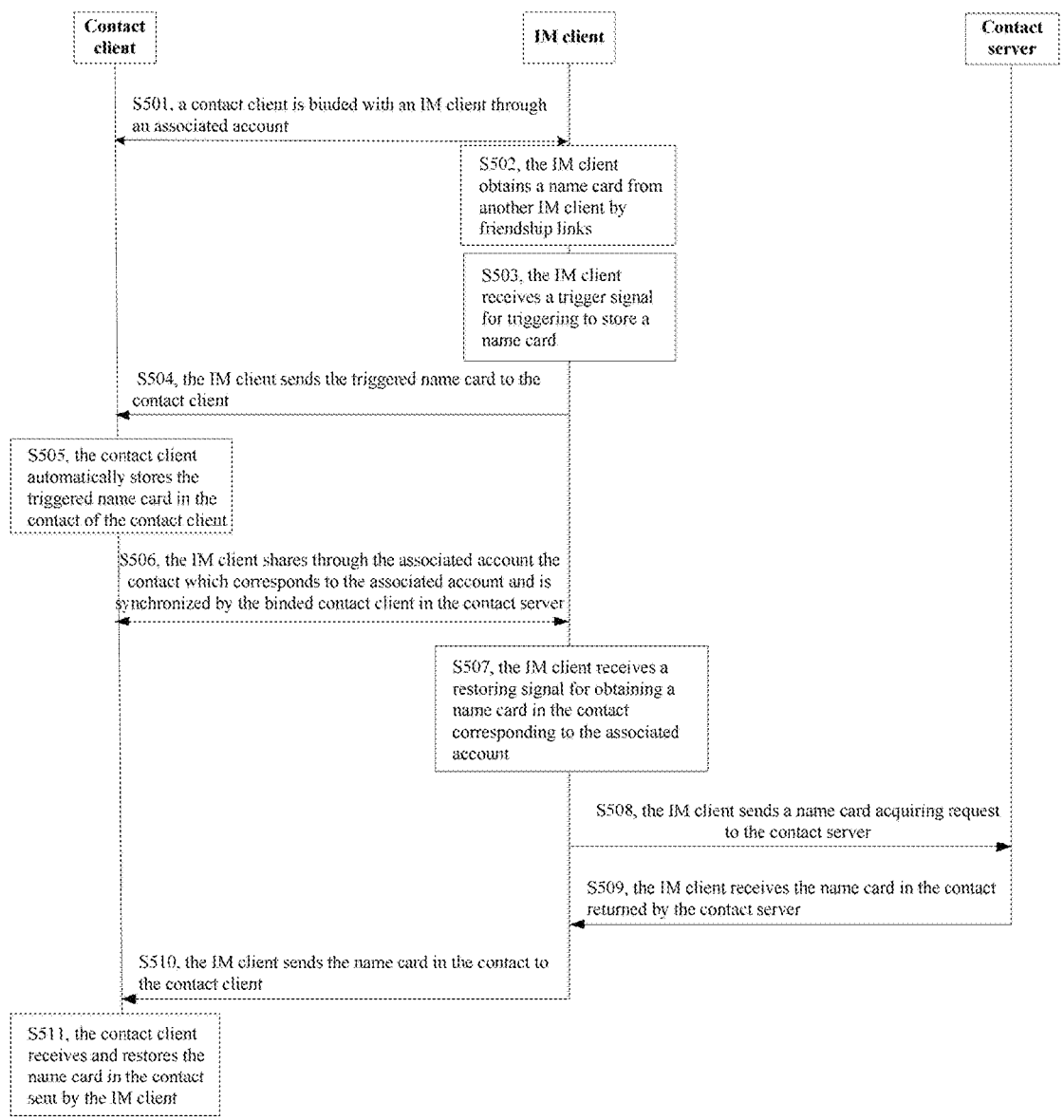
FIG. 5C is a flow diagram illustrating another method for exchanging a name card according to a fourth embodiment of the present disclosure.

Preferably, after the contact client is binded with the IM client, the IM client may access information in the contact client. Hence, the user may search in the IM client for the name card stored in the contact of the contact client, and may restore the name card stored in the contact client to the contact of the local contact client by the IM client. FIG. 5C is a flow diagram illustrating another method for exchanging a name card according to a fourth embodiment of the present disclosure. The method further includes the following procedures.

In S506, the IM client shares through the associated account the contact which corresponds to the associated account and is synchronized by the binded contact client in the contact server.

After the IM client is binded with the contact client, the IM client may access information in the contact client. When the contact in the contact client is stored locally, the contact in the contact client may also be synchronized in the contact server of the contact client. Hence, the IM client may share through the associated account the contact which corresponds to the associated account and is synchronized by the binded contact client in the contact server 130 as shown in FIG. 1.

In S507, the IM client receives a restoring signal for obtaining a name card in the contact corresponding to the associated account.

When the mobile phone is lost and the user needs to restore the contact by the IM client, the user may apply in the IM client a restoring signal for obtaining a name card in the contact corresponding to the associated account. Accordingly, the IM client may receive a restoring signal for obtaining a name card in the contact corresponding to the associated account.

For example, when the mobile phone is lost, in order to find all the name cards in the contact, the user may log on the IM client binded with the contact client, and apply a restoring signal in the IM client for obtaining a name card in the contact corresponding to the associated account.

It should be noted that, the name card generated by the contact client may include information in a text format, or a two-dimension code corresponding to the text information generated by a two-dimension code generator, or combination thereof. The specific manner of name card is not defined in detail herein.

In S508, the IM client sends a name card acquiring request to the contact server.

After the IM client receives a restoring signal, the IM client may send the name card acquiring request to the contact server. Accordingly, after receiving the name card acquiring request, the contact server may search for the stored contact corresponding to the associated account, and return the searched name card in the contact to the IM client. The name card acquiring request is configured to indicate the contact server to return the name card in the contact corresponding to the associated account.

It should be noted that in order to avoid that after the account used for logging on the IM client is stolen by unlawful hackers, the unlawful hackers steal the contact information of the user by the IM client, after the IM client sends a name card acquiring request to the contact server, the contact server may first request for authentication; after the IM client sends the correct authentication information to the contact server, then the contact server will search for the contact corresponding to the associated account, and return the searched contact to the IM client, which is not defined in detail herein.

In S509, the IM client receives the name card in the contact returned by the contact server.

In S510, the IM client sends the name card in the contact to the contact client.

After the IM client receives the name card in the contact returned by the contact server, the IM client may automatically send the name card in the contact to the contact client so as to enable the contact client to restore the name card in the contact.

It should be noted that, in practical implementation, after the IM client receives the name card in the contact returned by the contact server, the IM client may also receive a trigger signal input by the user, which is configured to restore the name card in the contact to the contact in the contact client; and after receiving the trigger signal, the IM client may send the name card in the contact to the contact client.

In S511, the contact client receives and restores the name card in the contact sent by the IM client.

Correspondingly, the contact client may receive the name card in the contact sent by the IM client, and after receiving the name card in the contact, the contact client may restore the received name card to the contact.

Based on the above, according to the method for exchanging a name card provided by the embodiment of the present disclosure, a contact client is binded with an IM client through an associated account; the contact client obtains a name card and adds the name card in the contact by the binded IM client, so that a problem in the prior art of low exchanging efficiency when exchanging a name card between the contact client and the IM client is solved; the name card in the contact client can be shared with the IM client, and the name card can be delivered using the friendship link in the IM client. Hence, the name card exchanging becomes convenient and rapid, and the exchanging efficiency is improved.

In the embodiment, by storing the name card received by the IM client in the local contact through a key, the rapid exchanging of the name card is achieved. In addition, by storing the name card in the local contact through a key without extra operations of the user, the operation complexity is reduced, and it becomes convenient for the user.

In the embodiment, by backing up the name card in the contact in the IM client, when the mobile phone is lost, the user may restore the name card in the contact by the IM client.

It should be noted that, in practical implementation, the IM client may also provide a function of public account. The user may obtain the name card in the contact of the contact client by a public account, and restore the obtained name card to the contact of the contact client by a public account. In the following embodiment, the method for restoring a name card by the public account is described in detail.

Embodiment 5

Figure 6:
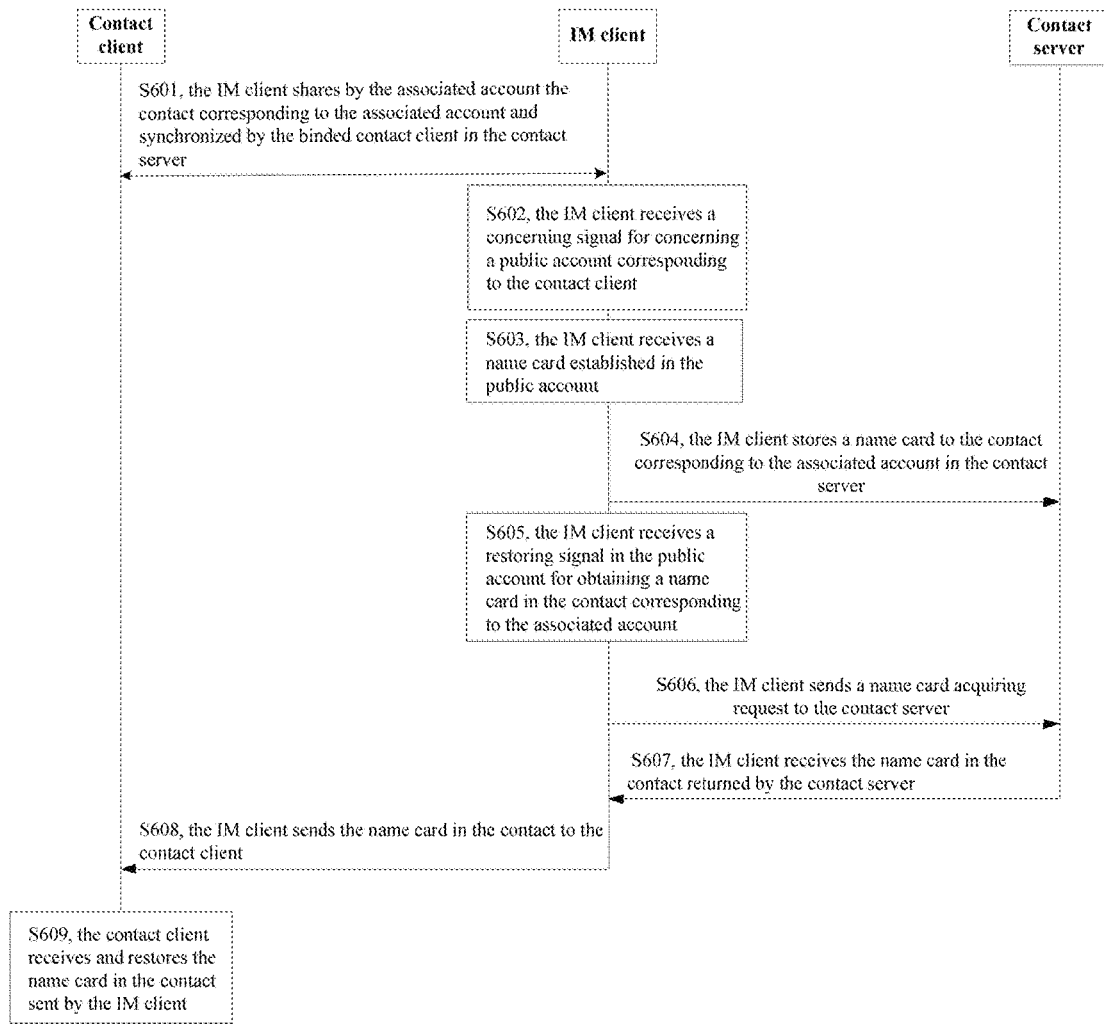
FIG. 6 is a flow diagram illustrating a method for restoring a name card according to a fifth embodiment of the present disclosure.

FIG. 6 is a flow diagram illustrating a method for restoring a name card according to a fifth embodiment of the present disclosure. In the embodiment, the method for exchanging a name card is applied in the architecture as shown in FIG. 1 for illustration. The method includes the following procedures.

In S601, the IM client shares by the associated account the contact corresponding to the associated account and synchronized by the binded contact client in the contact server.

After the IM client is binded with the contact client, the IM client may access information in the contact client. When the contact in the contact client is stored locally, the contact in the contact client may also be synchronized to the contact server of the contact client. Hence, the IM client may share by the associated account the contact corresponding to the associated account and synchronized by the binded contact client in the contact server.

In S602, the IM client receives a concerning signal for concerning a public account corresponding to the contact client.

The IM client may provide a public account. The public account may allow the user to establish a name card. Hence, when the user needs to use such function provided by the IM client, the user may concern the public account in the IM client. Accordingly, the IM client may receive a concerning signal for concerning a public account corresponding to the contact client.

In S603, the IM client receives a name card established in the public account.

After the user concerns the public account in the IM client, the user may establish a name card in the public account. Accordingly, the IM client may receive a name card established in the public account. In the embodiment, establishing a name card may include establishing a new name card or updating an already stored name card, which is not defined in detail herein.

In S604, the IM client stores a name card to the contact corresponding to the associated account in the contact server.

Because the contact client is binded with the IM client through an associated account, in order to share the name card with the contact client, the IM client may store a name card to the contact corresponding to the associated account in the contact server.

In S605, the IM client receives a restoring signal in the public account for obtaining a name card in the contact corresponding to the associated account.

When the mobile phone is lost and the user needs to restore the contact by the IM client, the user may apply in the public account a trigger signal for obtaining a name card in the contact corresponding to the associated account. Accordingly, the IM client may receive a restoring signal in the public account for obtaining a name card in the contact corresponding to the associated account.

It should be noted that, the name card generated by the contact client may include information in a text format, or a two-dimension code corresponding to the text information generated by a two-dimension code generator, or combination thereof. The specific manner of name card is not defined in detail herein.

In S606, the IM client sends a name card acquiring request to the contact server.

After the IM client receives a trigger signal, the IM client may send the name card acquiring request to the contact server. Accordingly, after receiving the name card acquiring request, the contact server may search for the stored contact corresponding to the associated account, and return the searched name card in the contact to the IM client. The name card acquiring request is configured to indicate the contact server to return the name card in the contact corresponding to the associated account.

It should be noted that, in order to avoid that an unlawful hacker steals the contact information of the user by the IM client after the account used for logging on the IM client is stolen by the unlawful hacker, after the IM client sends a name card acquiring request to the contact server, the contact server may first request for authentication; after the IM client sends the correct authentication information to the contact server, then the contact server will search for the contact corresponding to the associated account, and return the searched contact to the IM client, which is not defined in detail herein.

In S607, the IM client receives the name card in the contact returned by the contact server.

Correspondingly, the IM client may receive the name card in the contact returned by the contact server.

In S608, the IM client sends the name card in the contact to the contact client.

After the IM client receives the name card in the contact, the IM client may automatically send the name card in the contact to the contact client.

It should be noted that, in practical implementation, after the IM client receives the name card in the contact, the IM client may also receive a trigger signal input by the user for restoring the name card in the contact to the contact client; and after receiving the trigger signal, the IM client may send the name card in the contact to the contact client.

In S609, the contact client receives and restores the name card in the contact sent by the IM client.

Correspondingly, the contact client may receive the name card in the contact sent by the IM client, and after receiving the name card in the contact, the contact client may restore the received name card to the contact.

Based on the above, according to the method for exchanging a name card provided by the embodiment of the present disclosure, by concerning the public account in the IM client, and establishing a name card by the public account, or restoring the name card stored in the contact server to the contact of the contact client, a problem in the prior art of low exchanging efficiency when exchanging a name card between the contact client and the IM client is solved; the name card in the contact client can be shared with the IM client, and the name card can be delivered using the friendship link in the IM client. Hence, the name card exchanging becomes convenient and rapid, and the exchanging efficiency is improved.

Further, in the embodiment, when accessing the contact server by the public account, the contact server may first request for authentication; only after the contact server receives the correct authentication information, the contact server will return the name card in the contact. Hence, it can avoid the leakage of user information when the log-on account of the IM client is stolen and the contact information of the user is stolen.

Embodiment 6

Figure 7:
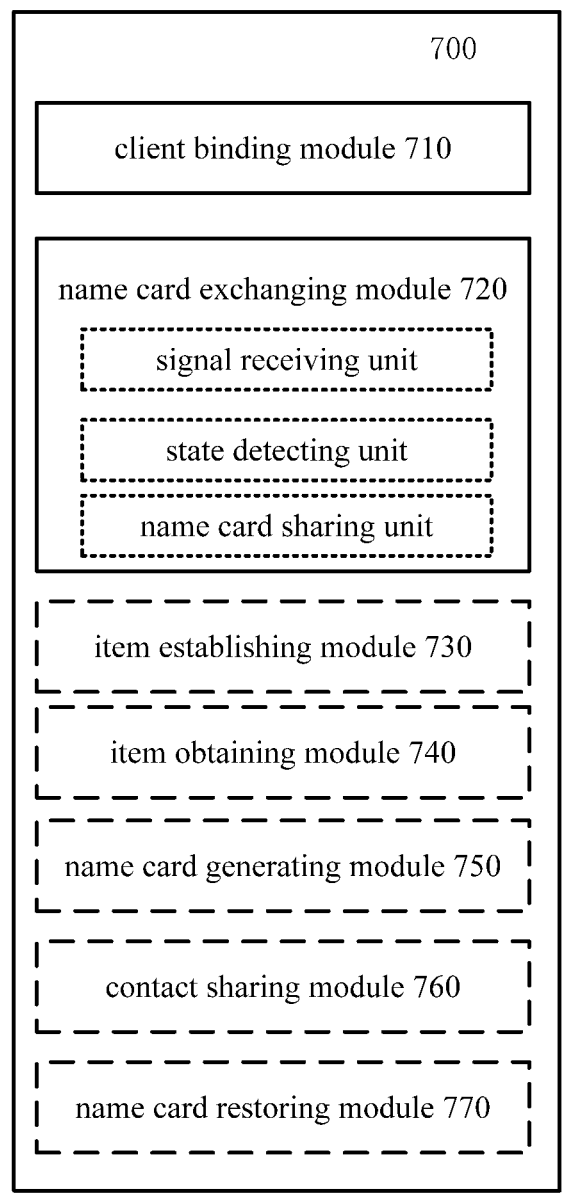
FIG. 7 is a schematic diagram illustrating a structure of an apparatus for exchanging a name card according to a sixth embodiment of the present disclosure.

FIG. 7 is a schematic diagram illustrating a structure of an apparatus 700 for exchanging a name card according to a sixth embodiment of the present disclosure. The apparatus may be implemented by software, hardware, or combination thereof to become all or part of the terminal. The apparatus is applied to the contact client. The apparatus 700 includes a client binding module 710 and a name card exchanging module 720.

The client binding module 710 is configured to bind with an IM client through an associated account.

The name card exchanging module 720 is configured to share a name card in the contact of the contact client through a friendship link in the binded IM client; and/or, obtain a name card through the friendship link in the binded IM client, and add the name card into the contact of the contact client.

In a first implementation of the embodiment, the name card exchanging module 720 includes:

a signal receiving unit, configured to receive a selecting signal for selecting at least one name card in the contact;

a state detecting unit, configured to detect whether the binded IM client is in an on-line state;

a name card sharing unit, configured to when detecting that the binded IM client is in an on-line state, send the selected name card to the IM client, so that the IM client sends the received name card to a designated friend in the IM client corresponding to the associated account, or sends to the social information sharing platform in the IM client.

In an implementation, the name card exchanging module 720 is configured to bind the contact client with a first IM client through an associated account, wherein the contact client comprises a contact; receive a selecting signal for selecting at least one name card in the contact; send the selected at least one name card to the first IM client binded with the contact client, wherein the first IM client comprises a first user account, and the first user account has a friendship link; and share the selected at least one name card through the first user account with at least one second IM client in the friendship link.

In another implementation, the name card exchanging module 720 is further configured to obtain a second user account of the second IM client in the friendship link through the first user account; receive a name card of the second user account; and add the received name card to the contact of the contact client.

In a second implementation of the embodiment, the apparatus further includes:

an item establishing module 730, configured to establish at least one item of the name card in the contact;

an item obtaining module 740, configured to obtain other items related to the at least one item from the IM server of the binded IM client according to the at least one item established in the item establishing module;

a name card generating module 750, configured to generate the name card according to both the at least one item established in the item establishing module and the other items obtained in the item obtaining module.

In a third implementation of the embodiment, the item obtaining module 740 includes:

an item sending unit, configured to send the at least one item and the associated account to the IM server through a predetermined interface;

an item receiving unit, configured to receive other items feed back by the IM server, where the other items are the items related to the at least one item, which are searched in the items corresponding to the associated account and/or in the friend items of the friendship links corresponding to the associated account after the IM server detects that the associated account has the authority to access data.

In a fourth implementation of the embodiment, the name card exchanging module is further configured to automatically store the triggered name card in the contact of the contact client, where the triggered name card is sent to the contact client after the IM client receives the name card sent by another IM client and receives a trigger signal for triggering to store a name card; the name card sent by another IM client is the name card directly sent to the IM client or the name card displayed in a social information sharing platform.

In a fifth implementation of the embodiment, the apparatus further includes:

a contact sharing module 760, configured to share with the binded IM client through the associated account the contact which corresponds to the associated account and is synchronized in the contact server;

a name card restoring module 770, configured to receive and restore the name card in the contact sent by the IM client, where the name card in the contact is sent to the contact client after the IM client receives a restoring signal for obtaining a name card in the contact corresponding to the associated account, sends a name card acquiring request to the contact server, and receives the name card in the contact returned by the contact server; the name card acquiring request is configured to indicate the contact server to return the name card in the contact corresponding to the associated account.

Based on the above, according to the apparatus for exchanging a name card provided by the embodiment of the present disclosure, a contact client is binded with an IM client through an associated account; the contact client shares a name card in the contact of the contact client through the friendship link in the binded IM client; and/or, obtains a name card through the friendship link in the binded IM client, and adds the name card into the contact of the contact client, so that a problem in the prior art of low exchanging efficiency when exchanging a name card between the contact client and the IM client is solved; the name card in the contact client can be shared with the IM client, and the name card can be delivered using the friendship link in the IM client. Hence, the name card exchanging becomes convenient and rapid, and the exchanging efficiency is improved.

Embodiment 7

Figure 8:
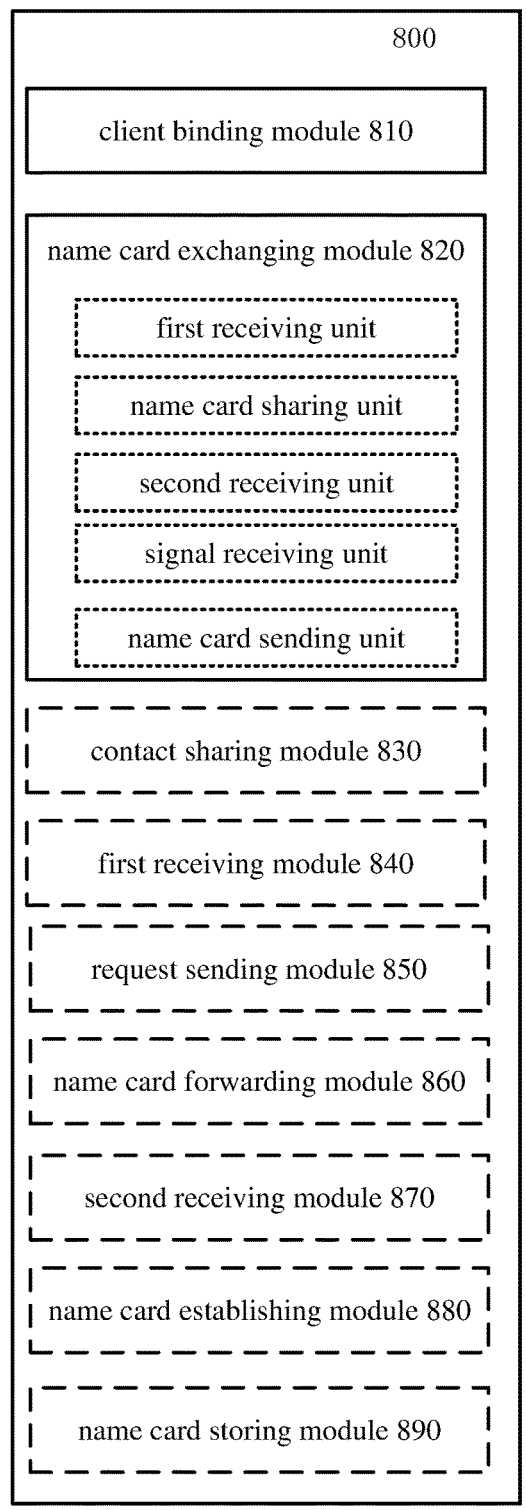
FIG. 8 is a schematic diagram illustrating a structure of an apparatus for exchanging a name card according to seventh embodiment of the present disclosure.

FIG. 8 is a schematic diagram illustrating a structure of an apparatus for exchanging a name card according to seventh embodiment of the present disclosure. The apparatus may be implemented by software, hardware, or combination thereof to become all or part of the terminal. The apparatus is applied to the IM client. The apparatus includes a client binding module 810 and a name card exchanging module 820.

The client binding module 810 is configured to bind with a contact client through an associated account.

The name card exchanging module 820 is configured to receive a name card in the contact of the binded contact client, and share the name card through the friendship link in the IM client; and/or, obtain a name card through the friendship link in the IM client, and send the name card to the binded contact client.

In a first implementation of the embodiment, the name card exchanging module 820 includes:

a first receiving unit, configured to receive the selected name card sent by the contact client;

a name card sharing unit, configured to send the selected name card to a designated friend in the IM client corresponding to the associated account, or send the selected name card to the social information sharing platform in the IM client corresponding to the associated account, where the selected name card is sent to the IM client after the contact client receives a selecting signal for selecting at least one name card in the contact and when the contact client detects that the binded IM client is in an on-line state.

In an implementation, the name card exchanging module 820 is configured to bind the first IM client with a contact client through an associated account; receive at least one name card sent by the contact client binded with the first IM client, wherein the first IM client comprises a first user account, and the first user account has a friendship link; and share the received at least one name card through the first user account with at least one second IM client in the friendship link.

In another implementation, the name card exchanging module 820 is further configured to obtain a second user account of the second IM client in the friendship link through the first user account; send a name card of the second user account to the contact client binded with the first IM client.

In a second implementation of the embodiment, the name card exchanging module 820 includes:

a second receiving unit, configured to receive a name card directly sent by another IM client, or receive a name card displayed by another IM client in the social information sharing platform;

a signal receiving unit, configured to receive a trigger signal for triggering to store a name card;

a name card sending unit, configured to send the triggered name card to the contact client, so that the contact client automatically stores the triggered name card in the contact of the contact client.

In a third implementation of the embodiment, the apparatus further includes:

a contact sharing module 830, configured to share through the associated account the contact which corresponds to the associated account and is synchronized by the binded contact client in the contact server;

a first receiving module 840, configured to receive a restoring signal for obtaining a name card in the contact corresponding to the associated account;

a request sending module 850, configured to send a name card acquiring request to the contact server according to the restoring signal, where the name card acquiring request is configured to indicate the contact server to return the name card in the contact corresponding to the associated account;

a name card forwarding module 860, configured to receive the name card in the contact returned by the contact server and send the name card in the contact to the contact client, so that the contact client restores the name card in the contact.

In a fourth implementation of the embodiment, the apparatus further includes:

a second receiving module 870, configured to receive a concerning signal for concerning a public account corresponding to the contact client;

a name card establishing module 880, configured to receive a name card established in the public account;

a name card storing module 890, configured to store the name card received in the name card establishing module to the contact corresponding to the associated account in the contact server;

where the second receiving module is further configured to receive a restoring signal in the public account for obtaining a name card in the contact corresponding to the associated account.

Based on the above, according to the apparatus for exchanging a name card provided by the embodiment of the present disclosure, a contact client is binded with an IM client through an associated account; the contact client shares a name card in the contact of the contact client through the friendship link in the binded IM client; and/or, obtains a name card through the friendship link in the binded IM client, and adds the name card into the contact of the contact client, so that a problem in the prior art of low exchanging efficiency when exchanging a name card between the contact client and the IM client is solved; the name card in the contact client can be shared with the IM client, and the name card can be delivered using the friendship link in the IM client. Hence, the name card exchanging becomes convenient and rapid, and the exchanging efficiency is improved.

It should be noted that, the apparatus for exchanging a name card described in the sixth embodiment and the apparatus for exchanging a name card described in the seventh embodiment may be implemented together to become all or part of the terminal. About the detailed technical details when implementation, please refer to the corresponding method embodiments, which are not described in detail herein.

It should be noted that, in the apparatus for exchanging a name card provided by the above-described embodiments, the aforementioned division of functional modules are described only by way of embodiments. In practical implementation, the aforementioned functionality can be distributed to different functional modules to perform based on needs, i.e., the internal structure of the apparatus can be divided into different functional modules to achieve all or part of the aforementioned functions. In addition, the apparatus for exchanging a name card provided by the above-described embodiments belong to the same idea with the method for exchanging a name card. The detailed implementation of the apparatus may refer to the method embodiments, which are not described in detail herein.

Embodiment 8

Figure 9:
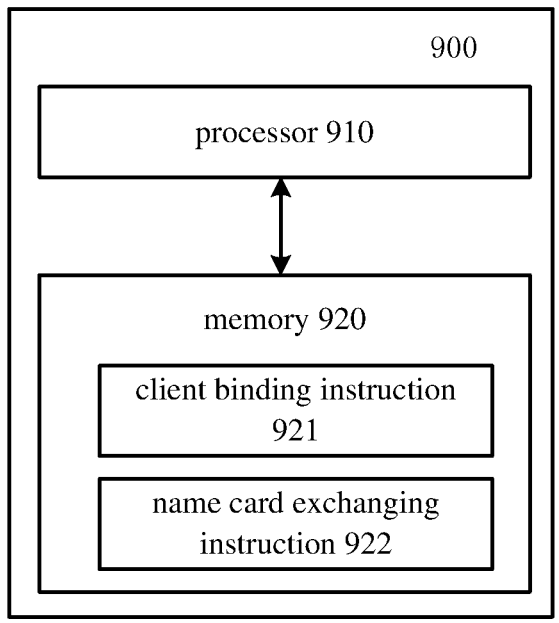
FIG. 9 is a schematic diagram illustrating a structure of a terminal for exchanging a name card according to an eighth embodiment of the present disclosure.

FIG. 9 is a schematic diagram illustrating a structure of a terminal 900 for exchanging a name card applied to a contact client in accordance with the eighth embodiment of the present disclosure.

As shown in FIG. 9, the terminal 900 may include a memory 920, and a processor 910 in communication with memory 920. Memory 920 may store the following instructions executable by processor 910, which are a client binding instruction 921 and a name card exchanging instruction 922.

The client binding instruction 921 may indicate to bind with an IM client through an associated account.

The name card exchanging instruction 922 may indicate to share a name card in the contact of the contact client through a friendship link in the binded IM client; and/or, obtain a name card through the friendship link in the binded IM client, and add the name card into the contact of the contact client.

Embodiment 9

Figure 10:
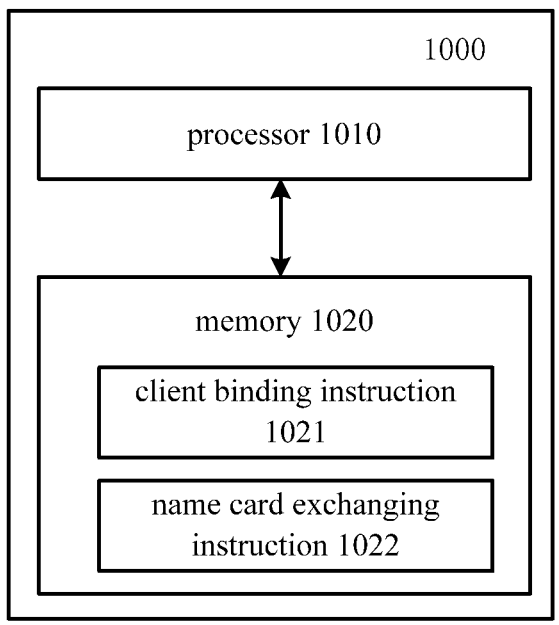
FIG. 10 is a schematic diagram illustrating a structure of a terminal for exchanging a name card in accordance with a ninth embodiment of the present disclosure.

FIG. 10 is a schematic diagram illustrating a structure of a terminal 1000 for exchanging a name card applied to an IM client in accordance with the ninth embodiment of the present disclosure.

As shown in FIG. 10, the terminal 1000 may include a memory 1020, and a processor 1010 in communication with memory 1020. Memory 1020 may store the following instructions executable by processor 1010, which are a client binding instruction 1021 and a name card exchanging instruction 1022.

The client binding instruction 1021 may indicate to bind with a contact client through an associated account.

The name card exchanging instruction 1022 may indicate to receive a name card in a contact of the binded contact client, and share the name card through a friendship link in the IM client; and/or, obtain a name card through the friendship link in the IM client, and send the name card to the binded contact client.

For the terminals according to the embodiments of the present disclosure, which correspond to the method and apparatus as described in the above embodiments applied to the contact client and the IM client respectively, the description about the terminals is simplified, and the relevant part may refer to the description about the method or apparatus.

The numbering of the above-described embodiments is only for description, but not represents any advantages or disadvantages of the embodiments.

Those skilled in the art may understand that part or all of the steps to implement the above-described embodiments may be accomplished by hardwares, and also may be accomplished by hardwares instructed by the programs. The programs may be stored within a computer-readable storage medium. The computer-readable storage medium may be a read-only memory (ROM), random-access memory (RAM), magnetic disk, or light disk, etc.

The foregoing is preferred embodiments of the present disclosure, which is not used for limiting the protection scope of the present disclosure. Any modifications, equivalent substitutions and improvements made within the spirit and principle of the present disclosure, should be covered by the protection scope of the present disclosure.

What is claimed is:

1. A method for exchanging a name card applied to a terminal, comprising:

binding, by a contact client running on the terminal, the contact client with a first Instant Messaging (IM) client running on the terminal through an associated account to implement information sharing between the contact client and the first IM client, the contact client comprising a contact and the associated account being a number of the terminal, the contact client being a first type of client operated in the terminal and the IM client being a second type of client operated in the terminal;

receiving, by the contact client running on the terminal, a selecting signal for selecting at least one name card in the contact;

sending, by the contact client running on the terminal, the selected at least one name card to the first IM client bound with the contact client via Software Development Kit (SDK) provided by the first IM client, the first IM client comprising a first user account, and the first user account having a friendship link; and sharing, by the first IM client running on the terminal, the selected at least one name card through the first user account with at least one second IM client in the friendship link, wherein the second IM client does not directly interact with the contact client;

wherein the sending the selected at least one name card to the first IM client bound with the contact client comprises:

detecting whether the first IM client bound with the contact client is in an on-line state;

selecting a sharing manner according to whether the first IM client is in the on-line state, wherein the sharing manner comprises sharing by the first IM client and sharing by a short message;

when detecting that the first IM client is in the on-line state, sending the selected at least one name card to the first IM client for sharing;

wherein the method further comprises:

obtaining a second user account of the second IM client in the friendship link through the first user account;

receiving a name card of the second user account;

adding the received name card to the contact of the contact client;

sharing with the first IM client bound with the contact client through the associated account the contact which corresponds to the associated account and is synchronized in a contact server;

receiving and restoring a name card in the contact sent by the first IM client;

wherein the name card in the contact is sent to the contact client after the first IM client receives a restoring signal for obtaining a name card in the contact corresponding to the associated account, sends a name card acquiring request to the contact server, and receives the name card in the contact returned by the contact server; and wherein the name card acquiring request is configured to indicate the contact server to return the name card in the contact corresponding to the associated account.

2. The method according to claim 1, wherein sending the selected at least one name card to the first IM client bound with the contact client comprises:

detecting whether the first IM client bound with the contact client is in an on-line state;

when detecting that the first IM client is in the on-line state, sending the selected at least one name card to a social information sharing platform of the first IM client.

3. The method according to claim 1, further comprising:

establishing at least one item of a friend in the contact;

obtaining other items related to the at least one item from an IM server of the first IM client bound with the contact client according to the at least one item; and generating a name card of the friend in a predetermined format according to both the at least one item and the obtained other items.

4. The method according to claim 3, wherein obtaining other items related to the at least one item from the IM server of the first IM client bound with the contact client according to the at least one item comprises:

sending the at least one item and the associated account to the IM server through a predetermined interface;

receiving other items feed back by the IM server, wherein the other items are the items related to the at least one item, which are searched in items corresponding to the associated account and/or in friend items of the friendship links corresponding to the first user account after the IM server detects that the associated account has an authority to access data.

5. The method according to claim 1, wherein receiving the name card of the second user account and adding the received name card to the contact of the contact client comprises:

receiving the name card of the second user account sent by the first IM client;

storing the name card of the second user account in the contact;

wherein the second IM client directly sends the name card of the second user account to the first IM client; or the second IM client displays the name card of the second user account in a social information sharing platform of the first IM client, so that the contact client receives the name card of the second user account through the social information sharing platform of the first IM client.

6. A method for exchanging a name card applied to a terminal, comprising:

binding, by a first Instant Messaging (IM) client running on the terminal, the first IM client with a contact client running on the terminal through an associated account to implement information sharing between the contact client and the first IM client, the associated account being a number of the terminal, the contact client being a first type of client operated in the terminal and the IM client being a second type of client operated in the terminal;

receiving, by the first Instant Messaging (IM) client running on the terminal, at least one name card sent by the contact client bound with the first IM client via Software Development Kit (SDK) provided by the first IM client, the first IM client comprising a first user account, and the first user account having a friendship link; and sharing, by the first Instant Messaging (IM) client running on the terminal, the received at least one name card through the first user account with at least one second IM client in the friendship link, wherein the second IM client does not directly interact with the contact client;

wherein the receiving at least one name card sent by the contact client bound with the first IM client comprises any one of:

receiving the at least one name card selected by the contact client bound with the first IM client, and receiving the at least one name card selected by the contact client bound with the first IM client through a social information sharing platform of the first IM client;

wherein the selected at least one name card is sent to the first IM client after the contact client receives a selecting signal for selecting at least one name card in the contact and when the contact client detects that the first IM client is in an on-line state, wherein the contact client selects a sharing manner according to whether the first IM client is in the on-line state, wherein the sharing manner comprises sharing by the first IM client and sharing by a short message;

wherein the method further comprises:

obtaining a second user account of the second IM client in the friendship link through the first user account;

sending a name card of the second user account to the contact client bound with the first IM client;

sharing with the contact client bound with the first IM client through the associated account the contact which corresponds to the associated account and is synchronized by the contact client in the contact server;

receiving a restoring signal for obtaining a name card in the contact corresponding to the associated account;

sending a name card acquiring request to the contact server according to the restoring signal, wherein the name card acquiring request is configured to indicate the contact server to return the name card in the contact corresponding to the associated account; and receiving the name card in the contact returned by the contact server and sending the name card in the contact to the contact client bound with the first IM client, so that the contact client bound with the first IM client restores the name card in the contact.

7. The method according to claim 6, wherein sending the name card of the second user account to the contact client bound with the first IM client comprises:

receiving the name card of the second user account sent by the second IM client; or receiving the name card of the second user account displayed by the second IM client in a social information sharing platform of the first IM client;

receiving a trigger signal for triggering to store the name card of the second user account; and sending the triggered name card to the contact client bound with the first IM client, so that the contact client bound with the first IM client stores the triggered name card in the contact of the contact client.

8. The method according to claim 6, further comprising:

receiving a concerning signal for concerning a public account corresponding to the contact client bound with the first IM client;

receiving a name card established in the public account;

storing the established name card to the contact corresponding to the associated account in the contact server; and receiving a restoring signal in the public account for obtaining a name card in the contact corresponding to the associated account.

9. An apparatus for exchanging a name card applied to a contact client, comprising: one or more processors; and a memory having instructions stored thereon, the instructions, when executed by the one or more processors, cause the processors to perform operations comprising:

binding the contact client with a first Instant Messaging (IM) client running on the terminal through an associated account to implement information sharing between the contact client and the first IM client, the contact client comprising a contact and the associated account being a number of the terminal, the contact client being a first type of client operated in the terminal and the IM client being a second type of client operated in the terminal;

receiving a selecting signal for selecting at least one name card in the contact;

sending the selected at least one name card to the first IM client bound with the contact client via Software Development Kit (SDK) provided by the first IM client, the first IM client comprising a first user account, and the first user account having a friendship link; and sharing the selected at least one name card through the first user account with at least one second IM client in the friendship link, wherein the second IM client does not directly interact with the contact client;

wherein the operations further comprises:

detecting whether the first IM client bound with the contact client is in an on-line state;

selecting a sharing manner according to whether the first IM client is in the on-line state, wherein the sharing manner comprises sharing by the first IM client and sharing by a short message;

when detecting that the first IM client is in the on-line state, sending the selected at least one name card to the first IM client for sharing;

wherein the operations further comprise:

obtaining a second user account of the second IM client in the friendship link through the first user account;

receiving a name card of the second user account;

adding the received name card to the contact of the contact client;

sharing with the first IM client bound with the contact client through the associated account the contact which corresponds to the associated account and is synchronized in a contact server;

receiving and restoring a name card in the contact sent by the first IM client;

wherein the name card in the contact is sent to the contact client after the first IM client receives a restoring signal for obtaining a name card in the contact corresponding to the associated account, sends a name card acquiring request to the contact server, and receives the name card in the contact returned by the contact server; and the name card acquiring request is configured to indicate the contact server to return the name card in the contact corresponding to the associated account.

10. The apparatus according to claim 9, wherein the operations further comprises:

establishing at least one item of a friend in the contact;

obtaining other items related to the at least one item from an IM server of the first IM client bound with the contact client according to the at least one item; and generating a name card of the friend in a predetermined format according to both the at least one item and the obtained other items.

* * * * *

UNITED STATES PATENT AND TRADEMARK OFFICE
CERTIFICATE OF CORRECTION

PATENT NO. : 10,397,147 B2
APPLICATION NO. : 15/100232
DATED : August 27, 2019
INVENTOR(S) : Jingzhong Li et al.

It is certified that error appears in the above-identified patent and that said Letters Patent is hereby corrected as shown below:

On the Title Page

Column 2, item (57), Abstract, Line 8, delete "one name one name" and insert --one name--, therefor.

Signed and Sealed this
Seventh Day of January, 2020

Andrei Iancu
*Director of the United States Patent and Trademark Office*